(12) United States Patent
Cheung

(10) Patent No.: US 8,955,173 B2
(45) Date of Patent: Feb. 17, 2015

(54) PORTABLE MULTIFUNCTIONAL COMMODE CHAIR

(76) Inventor: Sau Chun Cheung, Hong Kong (CN)

( * ) Notice: Subject to any disclaimer, the term of this patent is extended or adjusted under 35 U.S.C. 154(b) by 0 days.

(21) Appl. No.: 13/519,892

(22) PCT Filed: Feb. 9, 2012

(86) PCT No.: PCT/CN2012/070994
§ 371 (c)(1),
(2), (4) Date: Jun. 29, 2012

(87) PCT Pub. No.: WO2013/023447
PCT Pub. Date: Feb. 21, 2013

(65) Prior Publication Data
US 2014/0157505 A1 Jun. 12, 2014

(51) Int. Cl.
*A47K 11/04* (2006.01)
*A47K 11/02* (2006.01)
(52) U.S. Cl.
CPC ..................................... *A47K 11/02* (2013.01)
USPC ............... 4/483; 4/444; 4/448; 4/465; 4/479; 4/480; 4/484

(58) Field of Classification Search
USPC ..................... 4/444, 447, 448, 465, 479, 480, 4/483–485
See application file for complete search history.

(56) References Cited

U.S. PATENT DOCUMENTS

| | | | |
|---|---|---|---|
| 5,095,556 A * | 3/1992 | Franey | 4/483 |
| 6,523,187 B1 * | 2/2003 | Brink et al. | 4/484 |
| 7,185,375 B1 * | 3/2007 | Movsas | 4/484 |
| 7,200,878 B2 * | 4/2007 | Payne | 4/484 |
| 7,260,855 B2 * | 8/2007 | Aycock | 4/484 |
| 8,769,732 B2 * | 7/2014 | Mrugala | 4/484 |

* cited by examiner

*Primary Examiner* — Tuan N Nguyen

(57) ABSTRACT

A portable multifunctional commode chair includes: a chair including a foldable chair back, foldable chair legs and a cushion, wherein a seat hole is provided at a center of the cushion; a concave slot is provided along an edge of said seat hole; a plastic bag is provided in the seat hole and fixed in the concave slot; an anal plug for being inserted into an anus; an adjustable dripping stand hinged on the chair and comprising a dripping bag connected to the anal plug; a closing covering comprising an upper supporting ring and a lower supporting ring, wherein connecting elements are provided at a center of the upper supporting ring; an opaque textile or a plastic cloth is surrounding between the upper supporting ring and the lower supporting ring and a door for opening and closing is provided on the opaque textile or the plastic cloth.

20 Claims, 16 Drawing Sheets

PORTABLE MULTIFUNCTIONAL COMMODE CHAIR

CROSS REFERENCE OF RELATED APPLICATION

This is a U.S. National Stage under 35 USC 371 of the International Application PCT/CN2012/070994, filed Feb. 9, 2012.

BACKGROUND OF THE PRESENT INVENTION

1. Field of Invention

The present invention relates to a portable multifunctional commode chair.

2. Description of Related Arts

Commode chairs are usually used by the patients and the olds having reduced mobility. Conventionally, there is a hole in the chair for defecation. A commode bowl is placed under the hole each time. The conventional defecation method still lacks cleanness and environment friendliness and causes inconvenience despite being basically satisfactory. Moreover, most of the olds are bothered with constipation. The conventional methods and the commode chairs fail to solve the constipation problem of the olds. Besides, for outdoor activities or camping, the problem of defecation also remains to be solved.

SUMMARY OF THE PRESENT INVENTION

An object of the present invention is to provide a portable multifunctional commode chair to overcome disadvantages of conventional commode chairs.

The present invention adopts following technical solutions. The portable multifunctional commode chair comprises:

a chair comprising a foldable chair back, foldable chair legs and a cushion, wherein a seat hole is provided in a center part of the cushion; a circular concave slot is provided on an edge of the seat hole; first convex portions are symmetrically mounted on the circular concave slot; a movable clamping ring is buckled in the circular concave slot; a plastic bag is sleeved on the circular concave slot and has an opening pressed to be fixed on the circular concave slot by the movable clamping ring; a telescopic stainless steel pipe is provided on the foldable chair back;

wherein the movable clamping ring for being buckled with the circular concave slot has first concave portions corresponding with the first convex portions of the circular concave slot; a back end of the movable clamping ring and a lid are hinged with each other, wherein the opening of the plastic bag is pressed to be fixed on the circular concave slot through embedding the first convex portions of the circular concave slot in the first concave portions of the movable clamping ring;

an anal plug having a hollow cavity therein for being inserted into an anus for defecation by a constipator, wherein the anal plug has a cone-shaped head at a front end; a sphere is provided at a back end of the cone-shaped head and has a draining hole communicated with the hollow cavity;

an adjustable dripping stand hinged on the chair, wherein a dripping bag provided on the adjustable dripping stand is connected to the anal plug by dripping pipes; the anal plug is provided in the plastic bag; and a closing covering comprising an upper supporting ring and a lower supporting ring, wherein the lower supporting ring is fixed with the cushion of the chair by a fixing pole; first connecting elements are provided at a center of the upper supporting ring; the upper supporting ring is connected to the telescopic stainless steel pipe on the foldable chair back by the first connecting elements; an opaque textile or a plastic cloth is surrounded between the upper supporting ring and the lower supporting ring; a door for opening and closing is provided on the opaque textile or the plastic cloth.

The technical solutions further include the following.

The foldable chair back is hinged with a back side of the cushion by a hinging board of the chair back and also able to be folded with the cushion.

The foldable chair leg comprises a foldable leg and a telescopic leg. An upper end of the foldable leg is hinged with a bottom surface of the cushion by the hinging board of the chair back. A lower end of the foldable leg is inserted in the telescopic leg, wherein the foldable leg comprises an elastic sticking column and the telescopic leg has a row of positioning holes; the foldable leg has the elastic sticking column stuck in the positioning holes of the telescopic leg; the foldable leg is able to be folded with the cushion.

The plastic bag comprises a two-layer plastic bag having an internal layer and an external layer, wherein a space is provided between the internal layer and the external layer. An elastic tightening hole is provided at a top of the internal layer and piston valves are provided at a bottom of the internal layer so that excrement enters the external layer through the elastic tightening hole and the piston valves and remains between the internal layer and the external layer. Active carbons are further provided in the plastic bag.

The telescopic stainless steel pipe is further fixed on the foldable chair back; the lower supporting ring is symmetrically provided with second connecting elements and a top of the closing covering is provided with the first connecting elements, wherein the telescopic stainless steel pipe and the first connecting elements at the top of the closing covering are connected with each other; the cushion is connected to the second connecting elements on the lower supporting ring by the fixing pole.

Foldable armrests are connected to the foldable chair back. A back end of each foldable armrest is hinged on the foldable chair back by the hinging board of the chair back. A front end of the foldable armrest is hinged with an upright column by an armrest hinging board. A lower end of each upright column is inserted in each socket at two sides of the chair. The upright columns are able to be folded with the cushion.

The closing covering further comprises a built-up upright pole frame comprising an upright pole, the upper supporting ring and the lower supporting ring, wherein the upright pole has an upper end and a lower end respectively connected to the upper supporting ring and the lower supporting ring; the upright pole is fixed with the cushion of the chair by the fixing pole; the opaque textile or the plastic cloth is surrounded between the upper supporting ring and the lower supporting ring; the door for opening and closing is provided on the opaque cloth or the plastic cloth.

The door for opening and closing provided on the opaque textile or the plastic cloth is connected to the opaque textile by a zipper or a nylon hasp.

The second convex portion is mounted on a top end of the lid. The lid is connected to a second concave portion of a chair back pole on the foldable chair back by sticking the second convex portion therein.

The movable clamping ring and the lid are made of plastic or nano silver, or coated with chelating ionic silver.

The cone-shaped head at the front end of the anal plug is made of plastic or nano silver, or coated with chelating ionic silver.

The anal plug is made of potato starches.

The present invention has following beneficial results.

Firstly, the present invention is light and portable and able to be folded and used outdoors. Chair legs of the present invention are telescopic to suit for rough grounds and hills. The present invention is able to bear a maximal weight of 150 kilograms and suits for persons within the maximal weight of any shape.

Secondly there is no need to flush after using, which is environment friendly and beneficial to living.

Thirdly, it is clean and sanitary to use the present invention without flushing water. After using, it is easy to handle the whole plastic bag (the whole plastic bag can be bound) so that clothes and hands keep clean without any excrement or urine. The used plastic bag can be discarded at suitable places or buried in the soils to be dissolved without pollution.

Fourthly, there are outfits especially for the olds, such as constipators and patients of intestinal dysfunction. Physiological saline is available. A sebific duct is provided to be inserted in an anus and an according duct head (the anal plug) is specially designed in order to prevent an inverse flow of the physiological saline, flush intestines inside the anus, clean off the excrement after the physiological saline is absorbed and prevent inveterate excrement and constipation. All of the physiological saline, the sebific duct and the according duct head are supposed to be put in the plastic bag and be thrown away with the plastic bag to prevent bacterial infection.

Fifthly, the present invention suits for uncomfortable long-distance travelers and can be ever prepared in cars.

Sixthly, a tent (the closing covering) is provided to protect personal privacy of users. The chair and the tent are foldable to be easily stored.

Seventhly, during a period of outdoor activities, the present invention suits for a group. The plastic bag comprises the two layers, wherein the piston valves of the internal layer is able to avoid flowing backwardly so that the excrement and the urine remain on the external layer. The plastic bag can be used for several times and replaced with a new bag after being used by seven or eight persons, which saves money and time.

Eighthly, the zipper is provided out of the tent and allows the users to enter by pulling the zipper open. A button is connected to a top of the zipper to avoid pulling open the zipper from outsides and indicate an instant occupancy. A window is provided below a top of the tent.

1—built-up upright pole frame;
11—upper supporting ring;
13—lower supporting ring;
14—upright pole fixing hoop;
15—connecting element;
2—closing covering;
21—door;
3—dripping bag;
31—dripping pipe;
4—adjustable dripping stand;
41—fixing hoop of adjustable dripping stand;
5—chair;
51—foldable armrest;
52—upright column;
53—cushion;
531—seat hole;
532—circular concave slot;
533—sticking slot of dripping pipe;
534—socket;
536—first convex portion;
54—telescopic leg;
541—positioning hole;
55—foldable leg;
56—hinging board of armrest;
57—hinging board of chair back;
58—foldable chair back;
59—fixing board of adjustable dripping stand;
6—anal plug;
61—cone-shaped head;
62—draining hole;
63—sphere;
64—hollow cavity;
7—movable clamping ring;
71—lid;
72—hinge;
73—second concave portion;
74—second convex portion;
8—plastic bag;
9—telescopic stainless steel pipe;
10—fixing hoop of chair back;
20—hinging board of foldable leg;
30—fixing pole.

DETAILED DESCRIPTION OF THE PREFERRED EMBODIMENT

Combined with the drawings, the present invention is further illustrated as follows.

Figure 1:
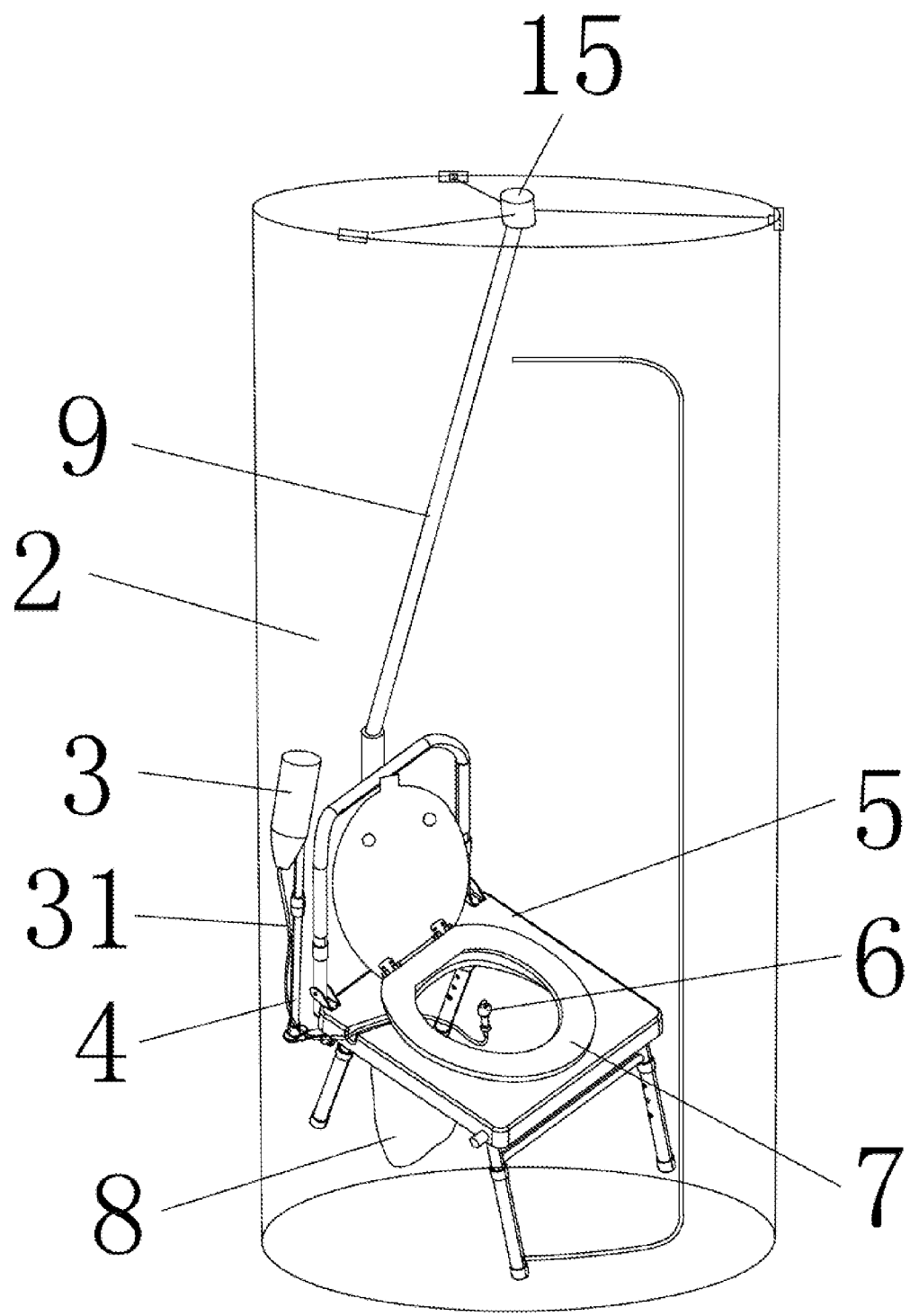
FIG. 1 is a perspective view of a portable multifunctional commode chair according to a first preferred embodiment of the present invention.
Figure 2:
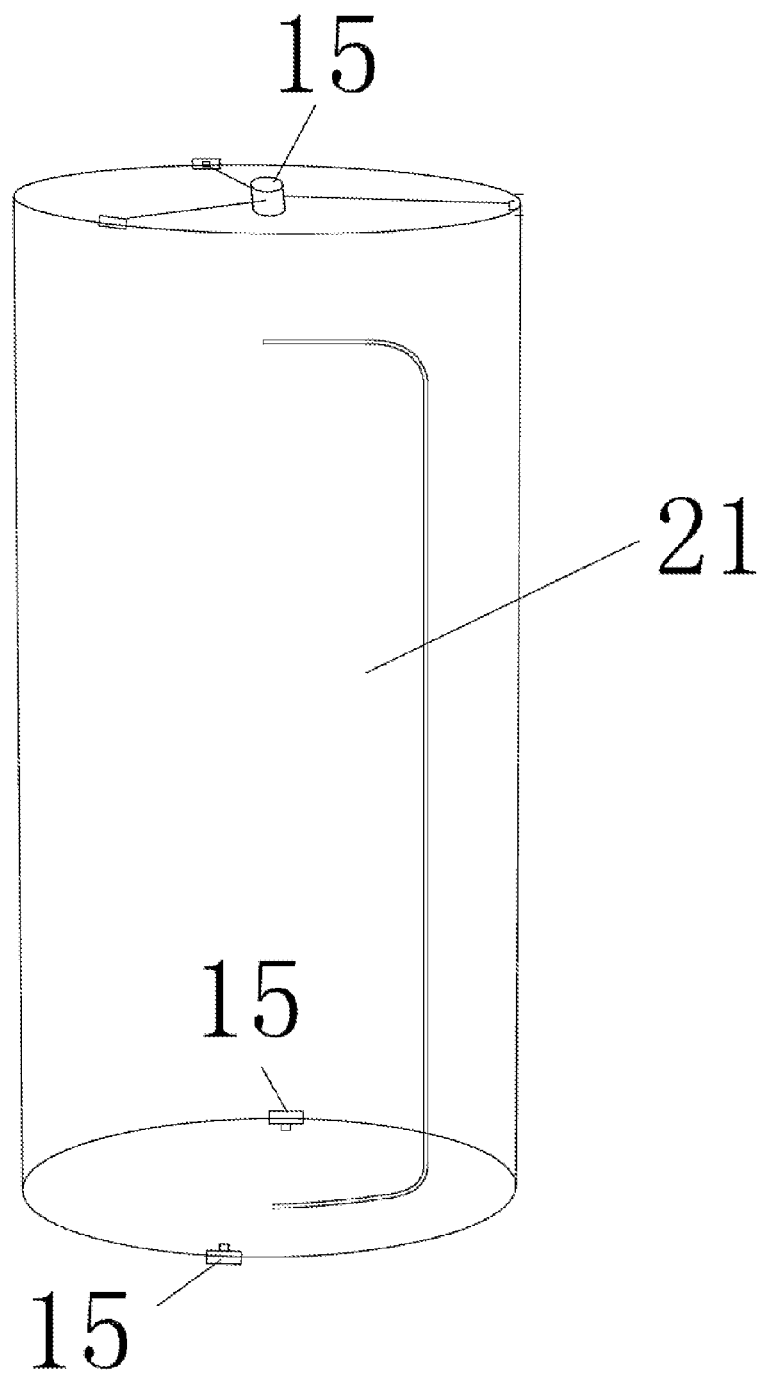
FIG. 2 is a perspective view of a closing covering of FIG. 1.
Figure 3:
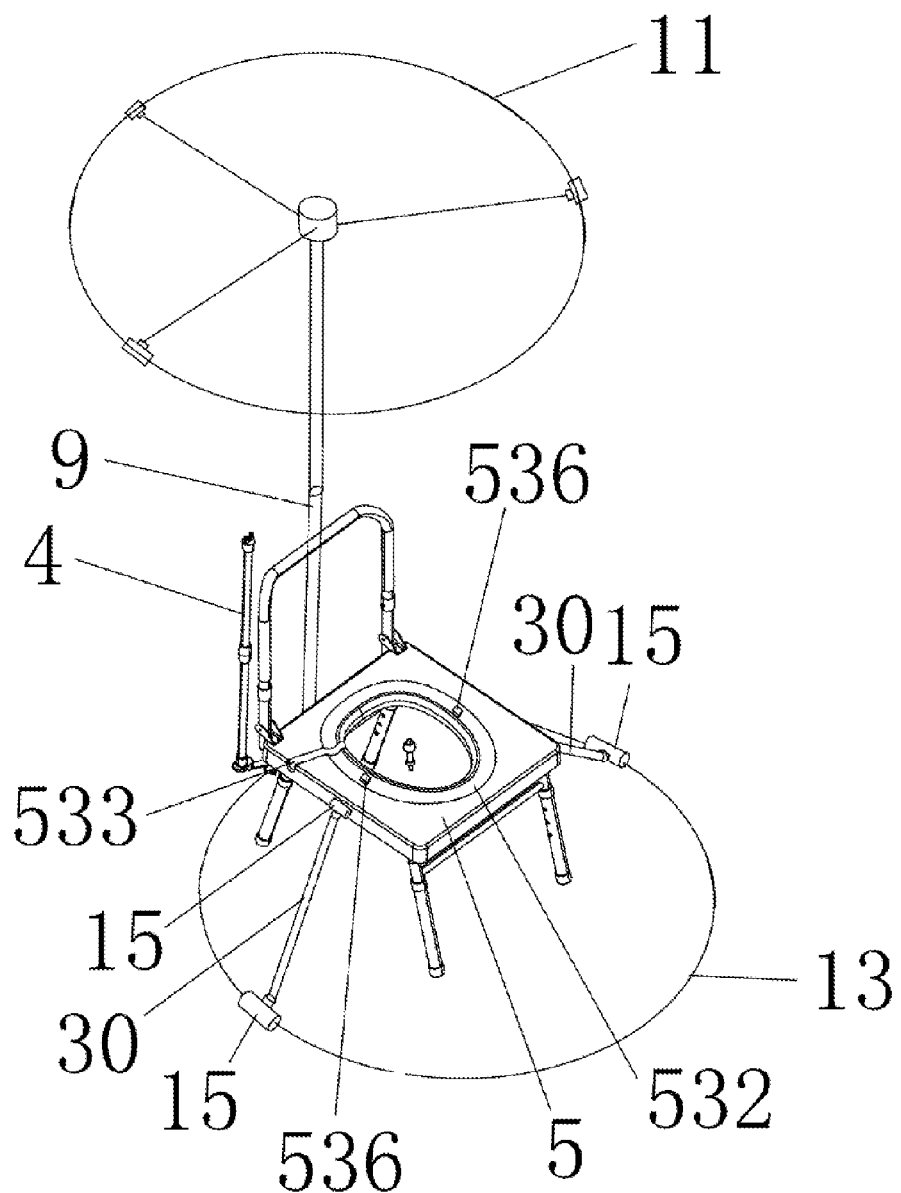
FIG. 3 is a perspective view of the closing covering and a chair of FIG. 1.

Referring to FIG. 1, the present invention comprises a closing covering 2, an adjustable dripping stand 4, a chair 5, an anal plug 6 and a movable clamping ring 7.

A First Preferred Embodiment

As shown in FIG. 1, the closing covering 2 is as tall as an ordinary person and comprises an upper supporting ring 11 and a lower supporting ring. The lower supporting ring 13 is symmetrically provided with second connecting elements 15 which are fixed with a cushion 53 of the chair 5 by a fixing pole 30. First connecting elements 15 are provided at a center of the upper supporting ring 11 and the upper supporting ring 11 is connected to a telescopic stainless steel pipe 9 on a foldable chair back 58 by the second connecting elements 15. An opaque textile or a plastic cloth is surrounded between the upper supporting ring 11 and the lower supporting ring 13 to form the cylindrical closing covering 2. A door 21 for opening and closing is provided on the opaque textile or the plastic cloth. The door 21 is also made of the opaque textiles or the plastic cloths. The door 21 is connected to the opaque textile by a zipper or a nylon hasp (not shown in the drawings) to realized functions of opening and closing.

The chair 5 is provided in an internal part of the cylindrical closing covering 2. The chair 5 comprises a foldable chair back 58, foldable chair legs and a cushion 53. The foldable chair leg comprises a foldable leg 55 and a telescopic leg 54, wherein an upper end of the foldable leg 55 is hinged at a bottom surface of the cushion 53 by a hinging board of the foldable leg 20 and a lower end of the foldable leg 55 is inserted in the telescopic leg 54. The foldable leg 55 further comprises an elastic sticking column (not shown in the drawings) and the telescopic leg 54 further has a row of positioning holes 541 for adjusting a length of the telescopic leg 54, wherein the foldable leg 55 is connected to the positioning holes 541 of the telescopic leg 54 by sticking the elastic sticking column therein and able to be folded with the cushion 53. The foldable chair back 58 is hinged at a back side of the cushion 53 by a hinging board of a chair back 57 and able to be folded with the cushion 53. The foldable chair back 58 further comprises a telescopic stainless steel pipe which is connected to the first connecting elements 15 at the top of the cylindrical closing covering 2 to protect the closing covering 2 from being blew down by winds. A seat hole 531 is provided at a center of the cushion 53. A circular concave slot 532 is provided along an edge of the seat hole 531. Two symmetrical convex portions 536 are mounted on the circular concave slot 532. The seat hole 531 is for being sleeved on by a plastic bag 8. The plastic bag 8 has an opening pressed to be stuck in the circular concave slot 532 by the movable clamping ring 7. The plastic bag 8 can comprise a two-layer plastic bag having an internal layer and an external layer, wherein a space is provided between the internal layer and the external layer; an elastic tightening hole is provided at a top of the internal layer and piston valves (not shown in the drawings) are provided at a bottom of the internal layer so that excrement enters the external layer through the elastic tightening hole and the piston valves and remains between the internal layer and the external layer to be closed and environment friendly. Third connecting elements 15 provided at two sides of the cushion 53 are fixed with the second connecting elements 15 of the lower supporting ring 13 by the fixing pole 30. The first connecting elements 15, the second connecting elements 15 and the third connecting elements 15 can be connected to the telescopic stainless steel pipe 9 and the fixing pole 30 through screw threads, through fasteners or through dowel pins.

The circular concave slot 532 of the cushion (working as a seat) 53 and the movable clamping ring 7 are overlapping and buckled with each other. The movable clamping ring 7 has an identical size and an identical shape to the circular concave slot 532. Two first concave portions 73 corresponding with the first convex portions 536 are provided on the movable clamping ring 7. A back end of the movable clamping ring 7 is hinged with a lid 71 by a hinge 72. The lid 71 can be covering on the seat hole 531. A second convex portion 74 is mounted on a top of the lid 71. When the lid 71 is raised, the lid 71 is connected to a second concave portion (not shown in the drawings) on a chair back pole of the foldable chair back 58 by sticking the second convex portion 74 therein. The plastic bag 8 is sleeved on the edge of the seat hole 531 and then pressed into the movable clamping ring 7. Herein, the plastic bag 8 has the opening pressed to be stuck in the circular concave slot 532 and the opening of the plastic bag 8 is embedded into the second concave portions 73 by the second convex portions 536 in order to prevent a detachment of the plastic bag 8. It is avoided to fix the movable clamping ring 7 with the chair 5 to suit for raising the movable clamping ring 7 and the lid 71. The cushion 53 further comprises a sticking slot of dripping pipes 533. A dripping pipe 31 is connected to the anal plug 6 by the sticking slot of dripping pipes 533. The movable clamping ring 7 and the lid 71 can be made of plastic or a mixture of nano silver and plastic, or coated with chelating ionic silver.

The anal plug 6 for constipators can be provided in the plastic bag 8. The anal plug 6 comprises a cone-shaped head 61, a sphere 63, a draining hole 62 and a hollow cavity 64. The cone-shaped head 61 is provided at a front end of the sphere 63. A back end of the sphere 63 is connected to a pipe body for connecting to a dripping pipe 31. The cone-shaped head 61 and the sphere 63 are for being inserted into an anus. A pair of the draining holes 62 is provided on the sphere 63. The hollow cavity 64 is connected to the dripping bag 3 by the dripping pipe 31. The dripping bag 3 has physiological saline. The hollow cavity 64 and the draining holes 62 send the physiological saline into the anus. The dripping bag 3 is hung on the adjustable dripping stand 4. If necessary, the excrement and urine can be added with active carbons to be deodorized and solidified before being abandoned at proper places.

A Second Preferred Embodiment

Figure 17:
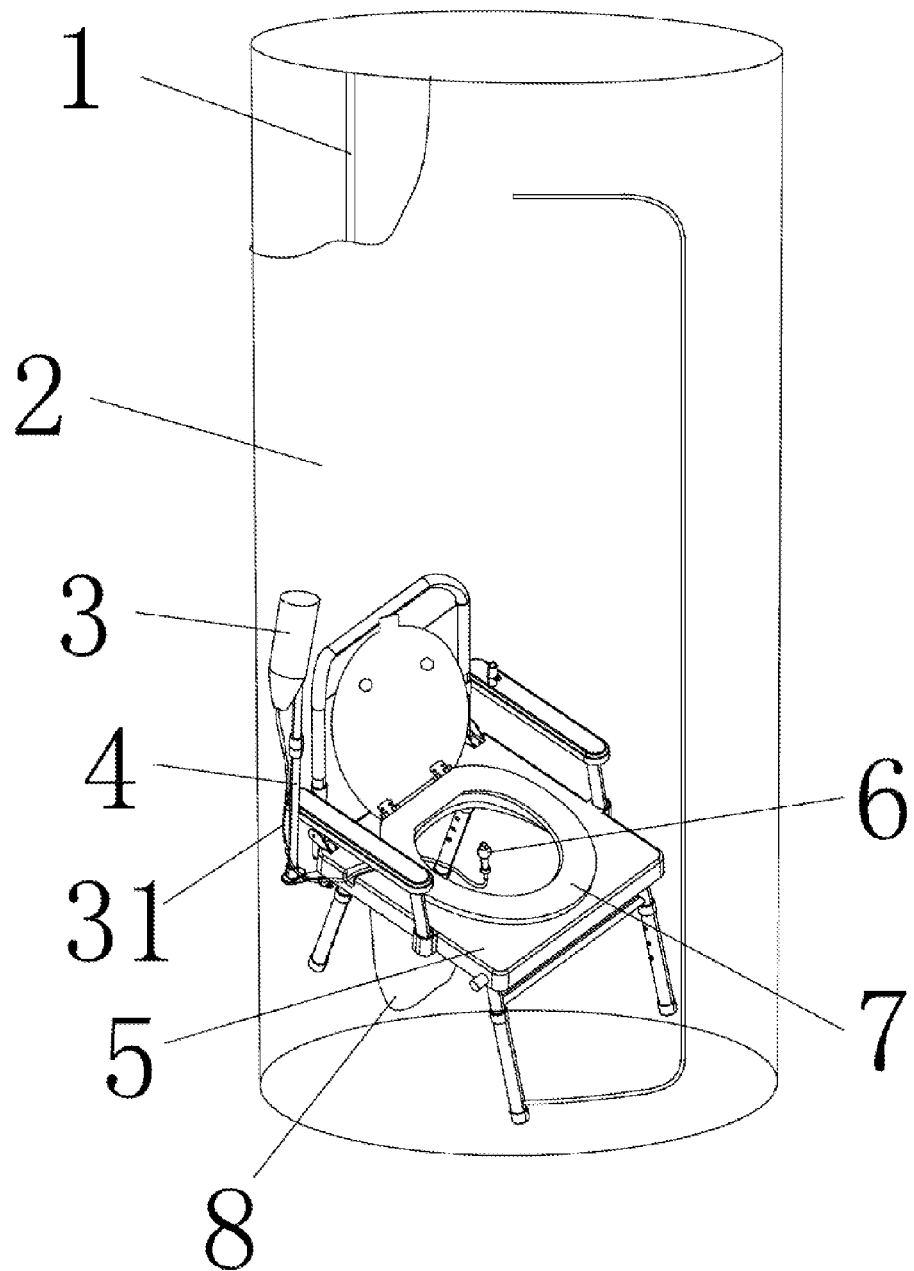
FIG. 17 is a perspective view of the portable multifunctional commode chair according to a second preferred embodiment of the present invention.
Figure 18:
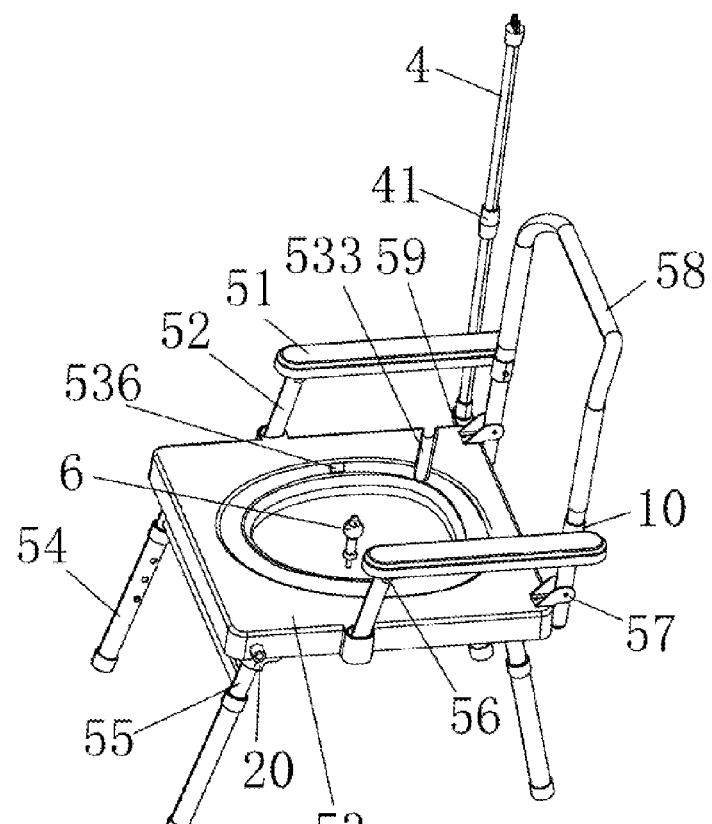
FIG. 18 is a perspective view of the chair of FIG. 17.
Figure 19:
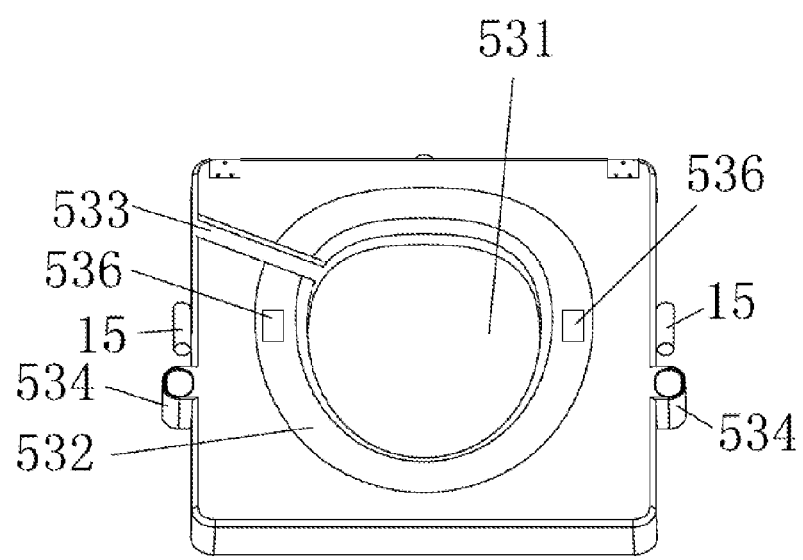
FIG. 19 is a perspective view of the cushion of FIG. 18.
Figure 20:
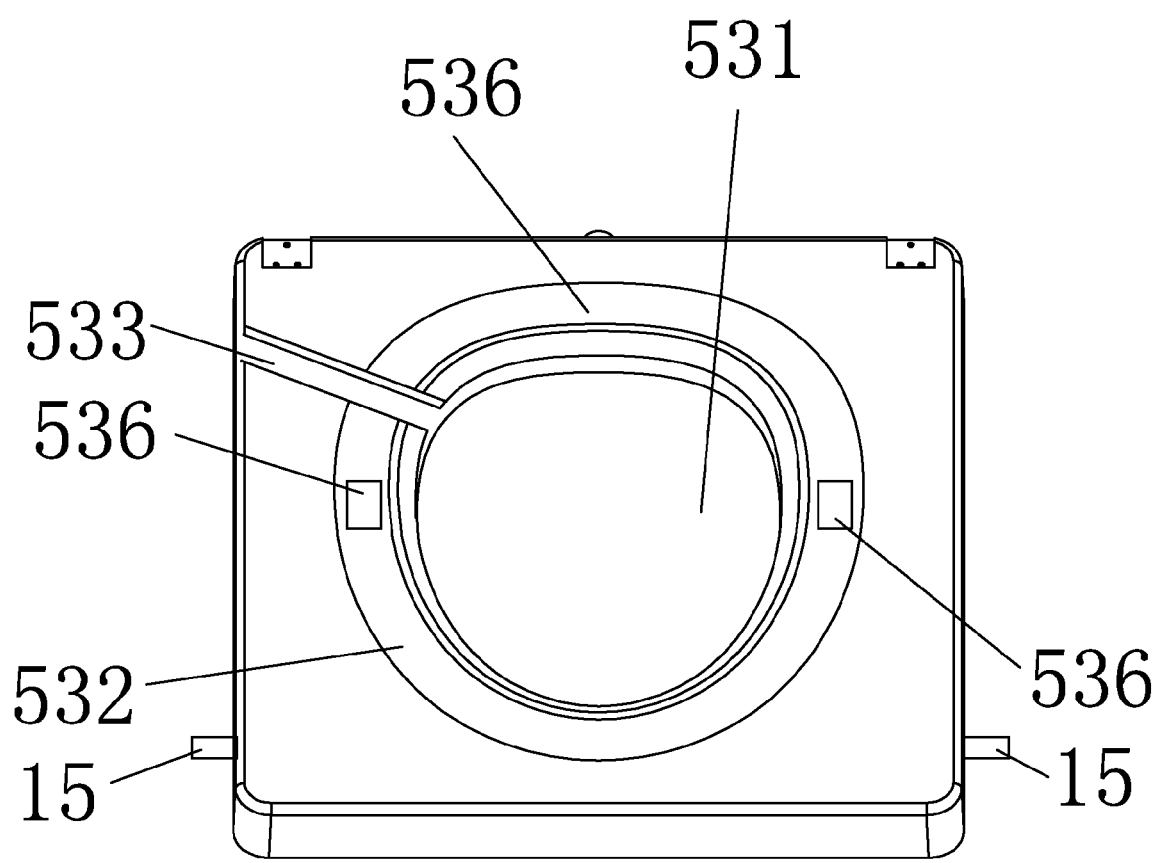
FIG. 20 is a perspective view of an alternative cushion of FIG. 6.
Figure 21:
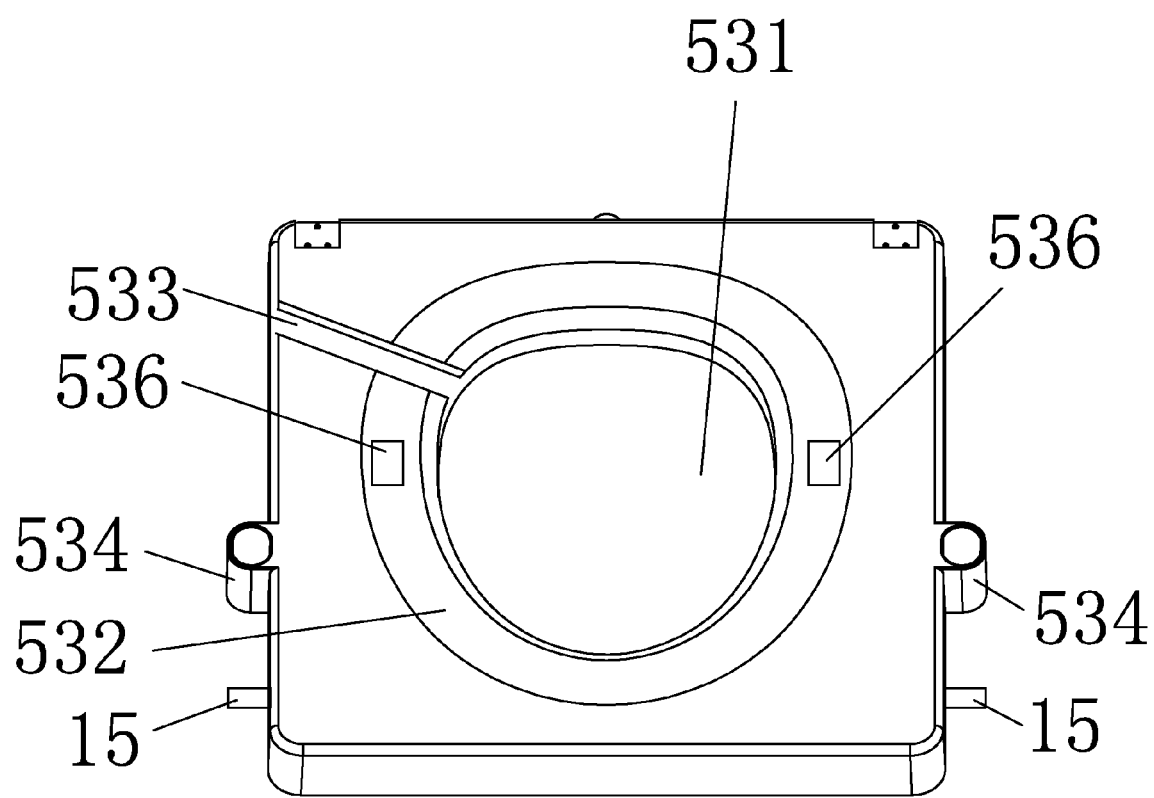
FIG. 21 is a perspective view of an alternative cushion of FIG. 19.

As shown in FIG. 17, based on the first preferred embodiment, the portable multifunctional commode chair further comprises a pair of foldable armrests 51.

A back end of each foldable armrest is hinged with the foldable chair back. A front end of the foldable armrest is hinged with an upright column 52 by a hinging board of armrests 56. Each upright column 52 has a lower end inserted into each socket 534 provided at two sides of the cushion 53 and is able to be folded with the cushion 53.

A seat hole 531 is provided at a center of the cushion 53. A circular concave slot 532 is provided along an edge of the seat hole 531. The cushion 53 further comprises a sticking slot of dripping pipes 533.

The closing covering 2 is almost as tall as an ordinary person and comprises a built-up telescopic pole at a back side and a surrounding opaque textile or a surrounding plastic cloth. The upper supporting ring 11 and the lower supporting ring 13 are provided, wherein the lower supporting ring 13 are symmetrically provided with the second connecting elements 15 which are connected to the fixing pole 30 for fixing the assembly and able to fix the fixing pole 30 with the cushion 53 of the chair 5. The opaque textile or the plastic cloth is surrounding between the upper supporting ring 11 and the lower supporting ring 13 to form the cylindrical closing covering 2. The door 21 for opening and closing is provided on the opaque textile or the plastic cloth. The door 21 is also made of an opaque textile or a plastic cloth. The door 21 is connected to the opaque textile by a zipper or a nylon hasp (not shown in the drawings) to accomplish opening and closing.

Figure 22:
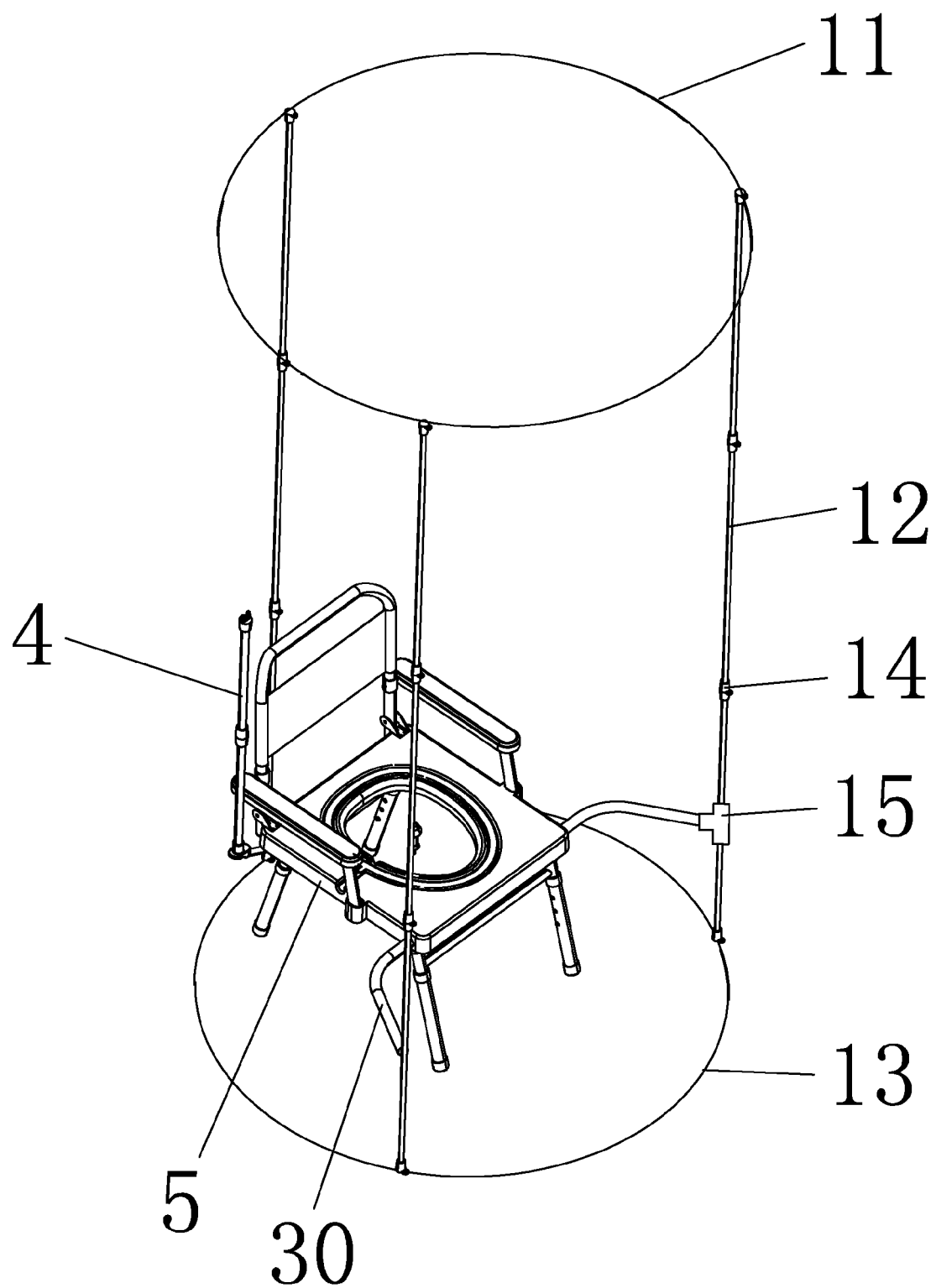
FIG. 22 is a perspective view of the chair of FIG. 17 and a built-up upright pole frame.
Figure 23:
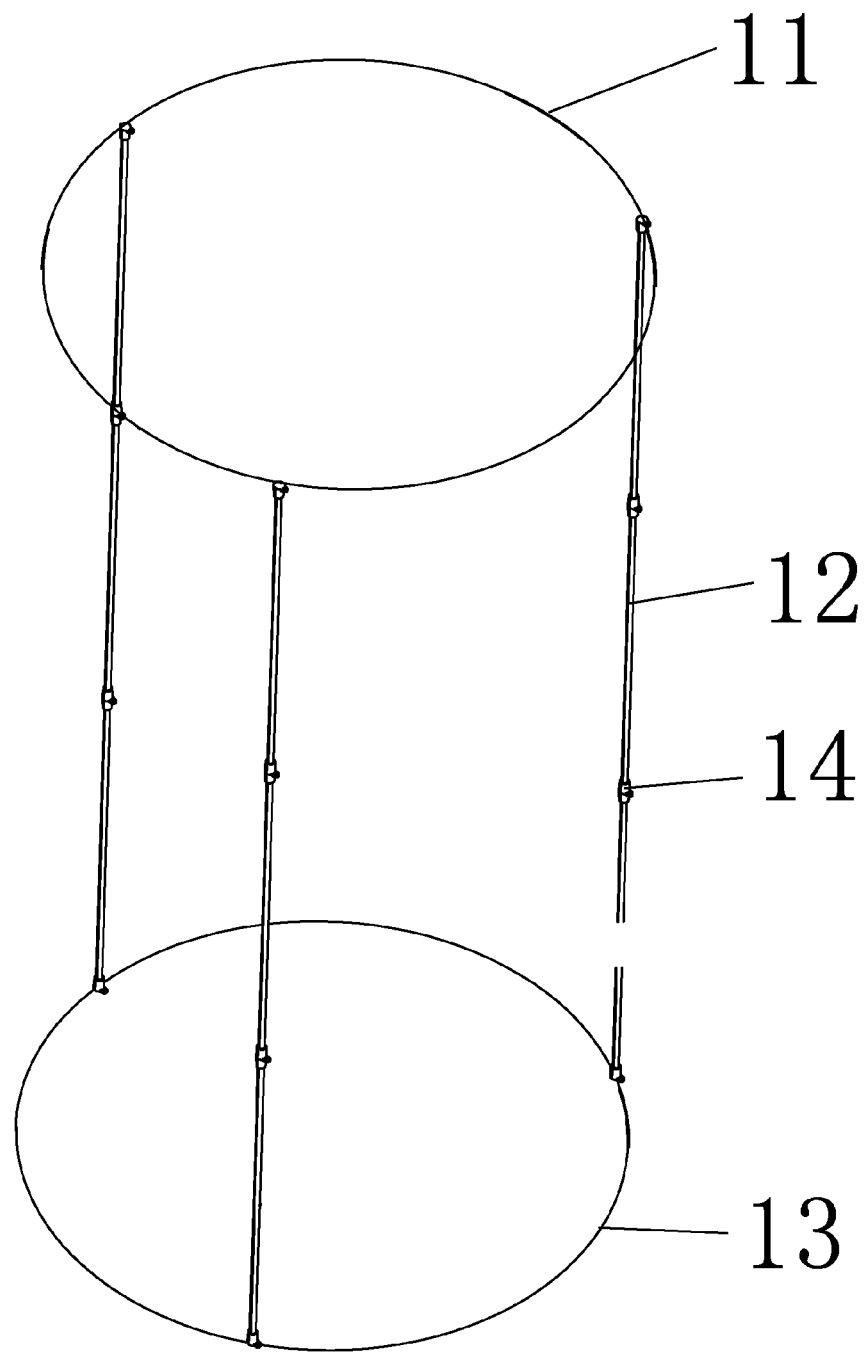
FIG. 23 is a perspective view of the built-up upright pole frame of FIG. 22.

FIG. 22 shows a first alternative mode of the closing covering 2 which comprises a built-up upright pole frame 1. The built-up upright pole frame 1 comprises 3 or 4 upright poles 12, the upper supporting ring 11 and the low supporting ring 13. An upper end and a lower end of the upright pole 12 are respectively connected to the upper supporting ring 11 and the lower supporting ring 13. The upright pole 12 is fixed with the third connecting elements 15 of the cushion 53 of the chair 5 through the fixing pole 30. The opaque textile or the plastic cloth is surrounding between the upper supporting ring 11 and the lower supporting ring 13. The door 21 for opening and closing is provided on the opaque textile or the plastic cloth. The door 21 is also made of an opaque textile or a plastic cloth. The door 21 is connected to the opaque textile by a zipper or a nylon hasp (not shown in the drawings) to accomplish opening and closing. The first alternative mode has good stability.

Figure 4:
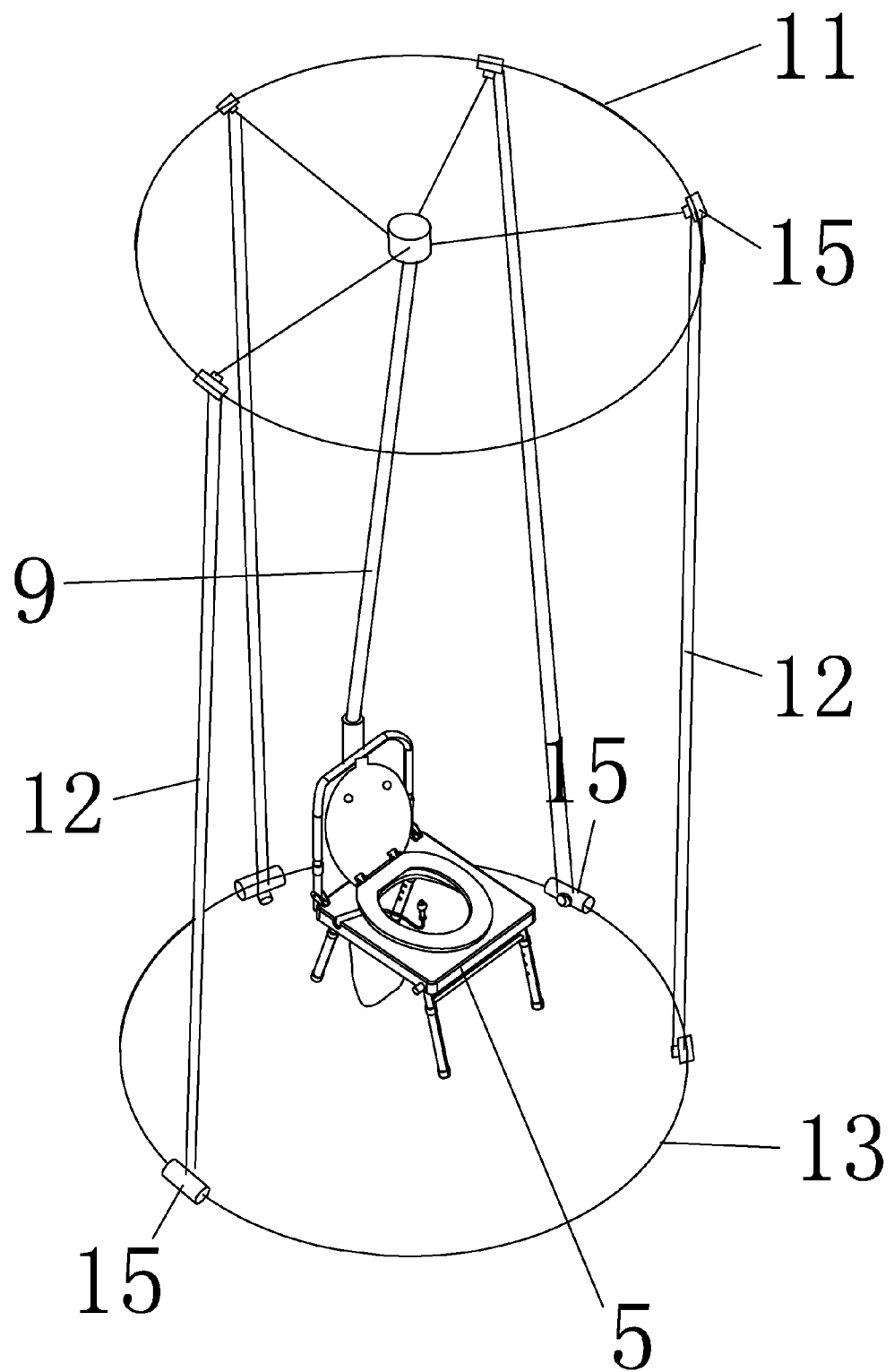
FIG. 4 is a perspective view of the closing covering of FIG. 3.
Figure 5:
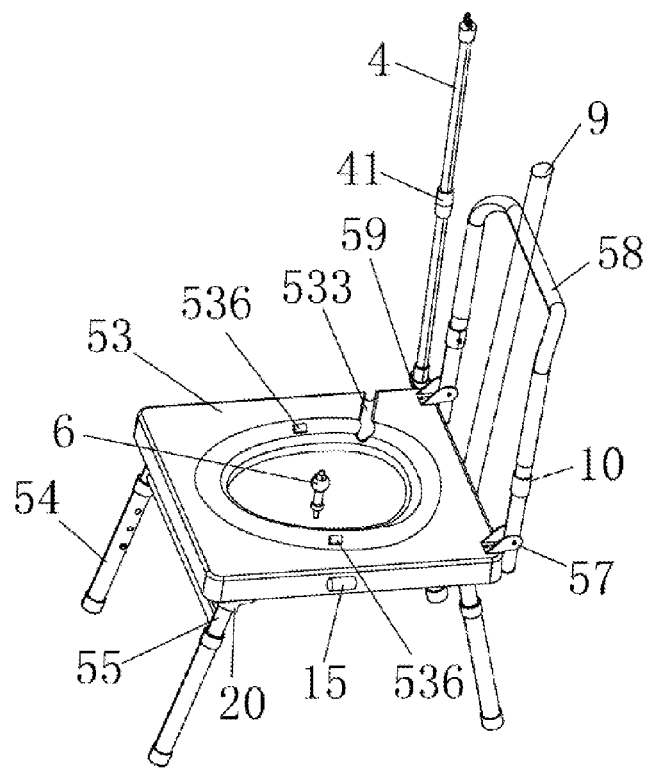
FIG. 5 is a perspective view of the chair of FIG. 1.
Figure 6:
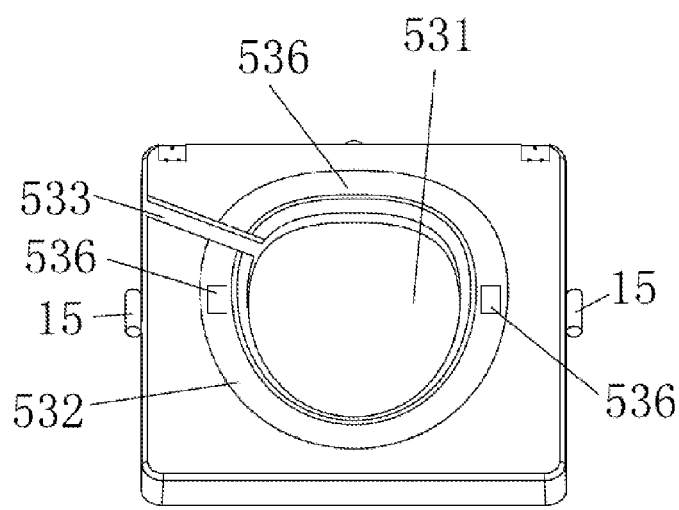
FIG. 6 is a perspective view of a cushion of FIG. 5.
Figure 7:
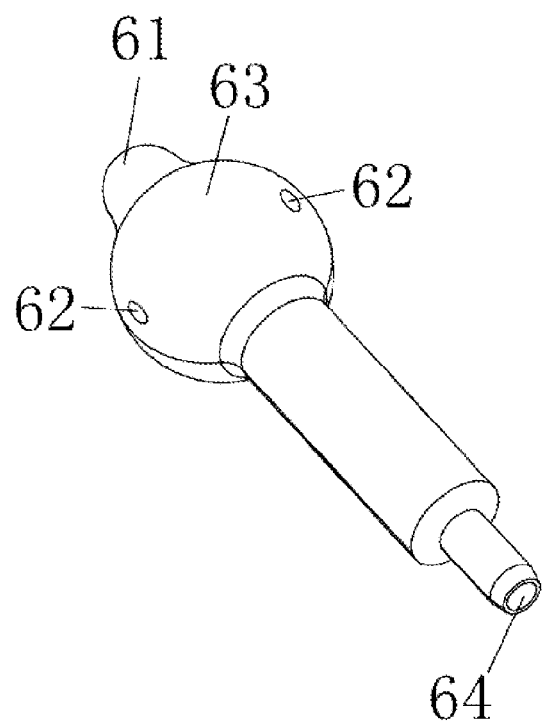
FIG. 7 is a perspective view of an anal plug of FIG. 5.
Figure 8:
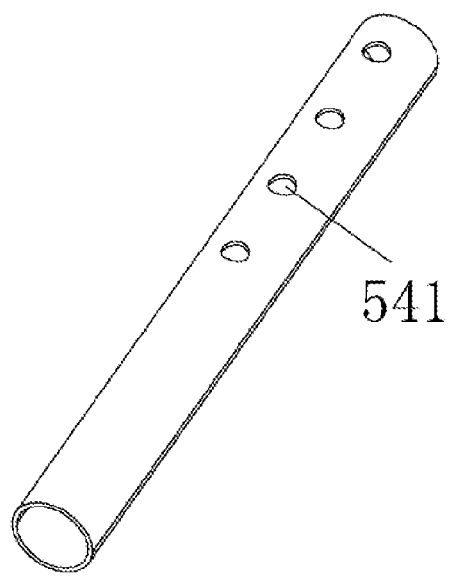
FIG. 8 is a perspective view of a telescopic leg of FIG. 5.
Figure 9:
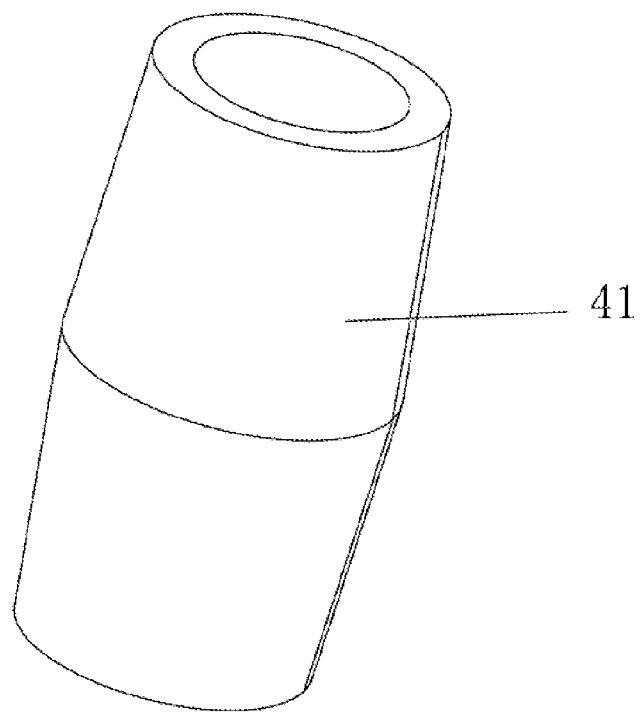
FIG. 9 is a perspective view of a fixing hoop of an adjustable dripping stand of FIG. 5.
Figure 10:
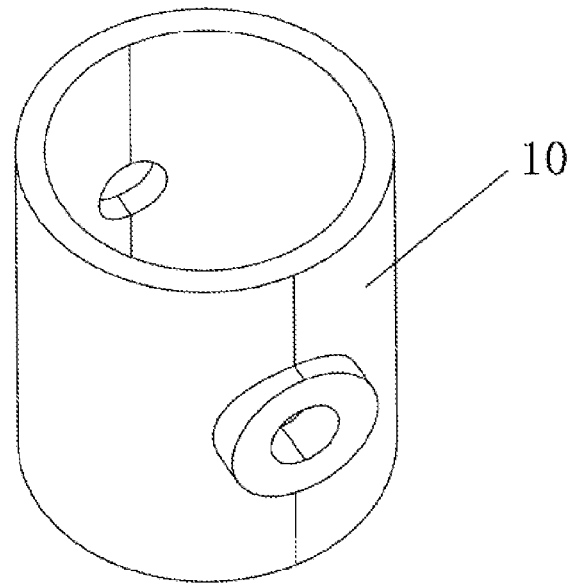
FIG. 10 is a perspective view of a fixing hoop of a chair back of FIG. 5.
Figure 11:
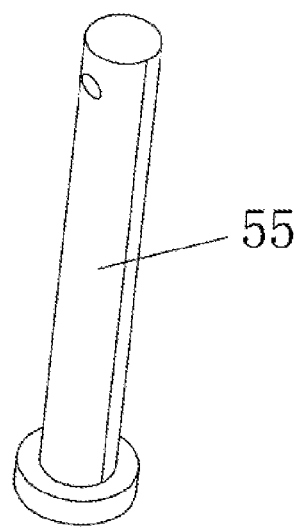
FIG. 11 is a perspective view of a foldable leg of FIG. 5.
Figure 12:
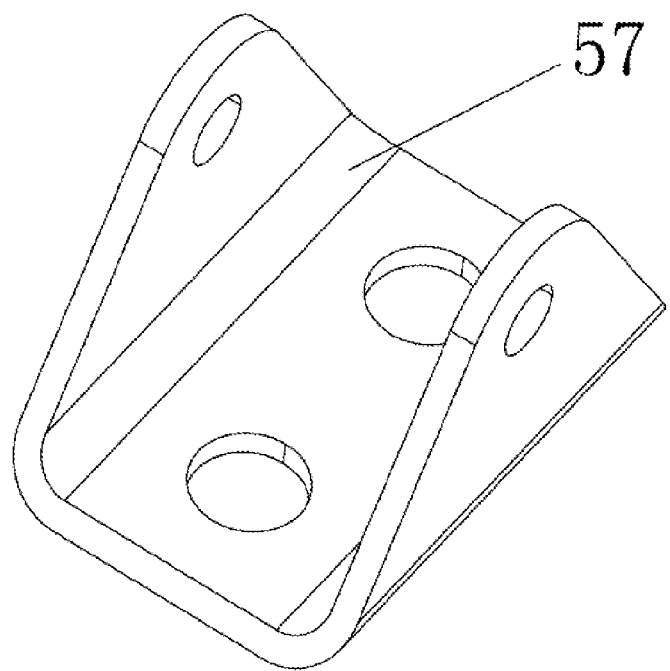
FIG. 12 is a perspective view of a hinging board of the chair back of FIG. 5.
Figure 13:
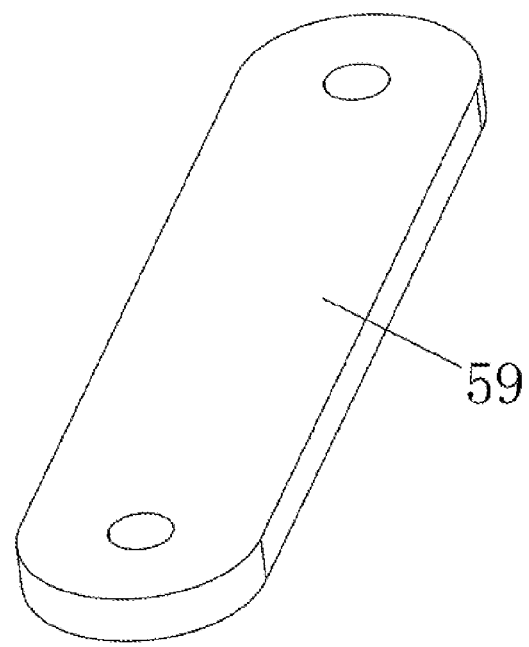
FIG. 13 is a perspective view of a fixing board of the adjustable dripping stand of FIG. 5.
Figure 14:
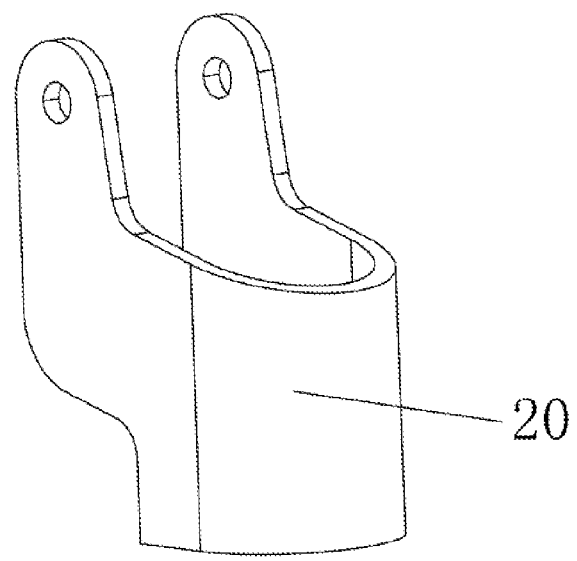
FIG. 14 is a perspective view of a hinging board of the foldable leg of FIG. 5.
Figure 15:
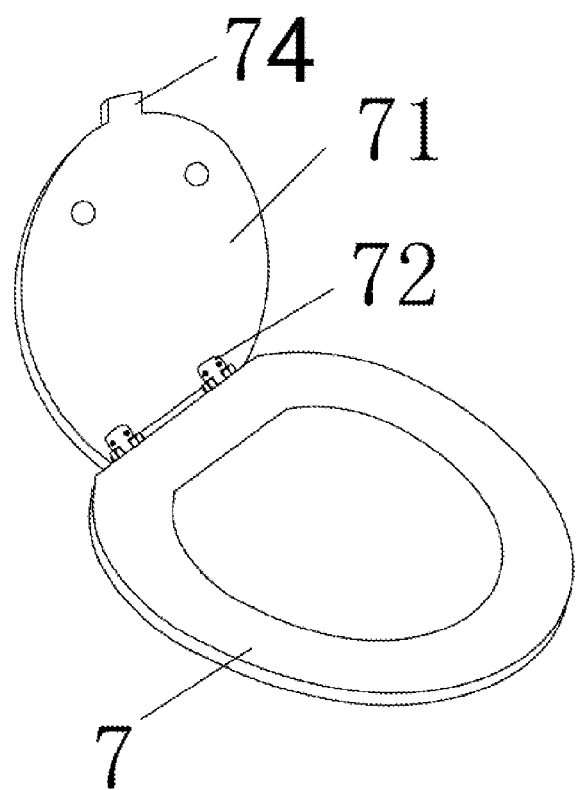
FIG. 15 is a perspective view of a movable clamping ring of FIG. 1.
Figure 16:
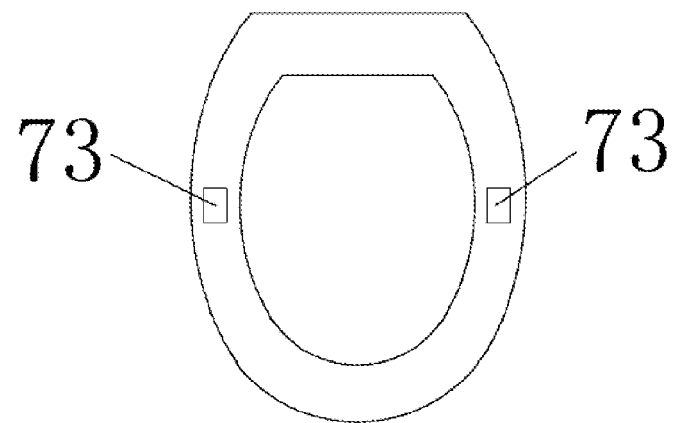
FIG. 16 is a bottom view of the movable clamping ring of FIG. 15.

FIG. 4 shows a second alternative mode of the closing covering 2 which comprises a built-up upright pole frame 1. The built-up upright pole frame 1 comprises 3 or 4 upright poles 12, the upper supporting ring 11 and the low supporting ring 13. An upper end and a lower end of the upright pole 12 are respectively connected to the upper supporting ring 11 and the lower supporting ring 13 respectively through the first connecting elements 15 and the second connecting elements 15. The first connecting elements 15 are provided in the center of the upper supporting ring and fixedly connected to the foldable chair back 58 of the chair 5 through the telescopic stainless steel pipe 9. The opaque textile or the plastic cloth is surrounding between the upper supporting ring 11 and the lower supporting ring 13. The door 21 for opening and closing is provided on the opaque textile or the plastic cloth. The door 21 is also made of an opaque textile or a plastic cloth. The door 21 is connected to the opaque textile by a zipper or a nylon hasp (not shown in the drawings) to accomplish opening and closing. The second alternative mode has good stability.

The movable clamping ring, the lid and the cone-shaped head provided at the front end of the anal plug are all made of plastic or a mixture of plastic and nano silver, or coated with chelating ionic silver.

Potato starches are biodegradable plastic whose main constituents are starches and polylactic acid without any conventional plastic constituent. The potato starches are decomposed into carbon dioxide and water in an oxygen-rich environment and into carbon dioxide and methane in an oxygen-poor environment. The polylactic acid is made from lactic acid and resistant to UV and strong acid. Plastic made of the potato starches is able to get a composting authorization ISO 14855. The plastic can be absorbed by human bodies and medical sutures are also made of the plastic.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A portable multifunctional commode chair comprising:
a chair comprising a foldable chair back, foldable chair legs and a cushion, wherein a seat hole is provided at a center of said cushion; a circular concave slot is provided along an edge of said seat hole; first convex portions are symmetrically provided in said circular concave slot; a movable clamping ring is buckled in said circular concave slot; a plastic bag is sleeved on said circular concave slot; an opening of said plastic bag is pressed to be fixed on said circular concave slot by said movable clamping ring; a telescopic stainless steel pipe is provided on said foldable chair back;
wherein said movable clamping ring for being buckled with said circular concave slot has first concave portions corresponding with said first convex portions of said circular concave slot; a back end of said movable clamping ring and a lid are hinged with each other, wherein said opening of said plastic bag is pressed to be fixed in said circular concave slot by embedding said first convex portions of said circular concave slot in said concave portions of said movable clamping ring;
an anal plug having a hollow cavity therein for being inserted into an anus for defecation by constipators, wherein a front end of said anal plug comprises a cone-shaped head whose back end is connected to a sphere; draining holes communicated with said hollow cavity are provided on said sphere;
an adjustable dripping stand hinged on said chair and comprising a dripping bag, wherein dripping pipes connect said dripping bag to said anal plug and said anal plug is provided in said plastic bag; and
a closing covering comprising an upper supporting ring and a lower supporting ring, wherein a fixing pole fixes said lower supporting ring with said cushion of said chair; first connecting elements are provided at a center of said upper supporting ring; said upper supporting ring is connected to said telescopic stainless steel pipe on said foldable chair back by said first connecting elements; an opaque textile or a plastic cloth is surrounding between said upper supporting ring and said lower supporting ring; a door for opening and closing is provided on said opaque textile or said plastic cloth.

2. The portable multifunctional commode chair, as recited in claim 1, wherein a first hinging board is provided to allow said foldable chair back and a back side of said cushion to be hinged with each other; said foldable chair back is able to be folded with said cushion.

3. The portable multifunctional commode chair, as recited in claim 2, wherein each of said telescopic chair legs comprises a foldable leg and a telescopic leg, wherein an upper end of said foldable leg and a bottom surface of said cushion are hinged with each other; a second hinging board is provided to allow said upper end of said foldable leg to be hinged with said bottom surface of said cushion; a lower end of said foldable leg is inserted in said telescopic leg, wherein said foldable leg comprises an elastic sticking column and said telescopic leg has a row of positioning holes; said foldable leg is connected to said positioning holes of said telescopic leg by sticking said elastic sticking column therein; said foldable leg is able to be folded with said cushion.

4. The portable multifunctional commode chair, as recited in claim 3, wherein said plastic bag comprises a two-layer plastic bag having an internal layer and an external layer and a space is provided between said internal layer and said external layer, wherein an elastic tightening hole is provided at a top of said internal layer and piston valves are provided at a bottom of said internal layer so that excrement enters said external layer through said elastic tightening hole or said piston valves and remains between said internal layer and said external layer; active carbons are further provided in said plastic bag.

5. The portable multifunctional commode chair, as recited in claim 4, wherein said telescopic stainless steel pipe is further mounted on said foldable chair back; second connecting elements are symmetrically provided on said lower supporting ring and said first connecting elements are provided at a top of said closing covering, wherein said telescopic stainless steel pipe and said first connecting elements at said top of said closing covering are connected with each other and said cushion is connected with said second connecting elements on said lower supporting ring by said fixing pole.

6. The portable multifunctional commode chair, as recited in claim 5, wherein a pair of foldable armrests are further connected to said foldable chair back; a back end of each said foldable armrest is hinged on said foldable chair back; a third hinging board is provided to allow said back end of each said foldable armrest to be hinged on said foldable chair back; a front end of each said foldable armrest and each of a pair of upright column are hinged with each other; hinging boards of armrests are provided to allow said front end of each said foldable armrest to be hinged with said upright column; two sockets are provided at two sides of said chair and a lower end of each said upright column is inserted in each said socket; each said upright column is able to be folded with said cushion.

7. The portable multifunctional commode chair, as recited in claim 2, wherein said plastic bag comprises a two-layer plastic bag having an internal layer and an external layer and a space is provided between said internal layer and said external layer, wherein an elastic tightening hole is provided at a top of said internal layer and piston valves are provided at a bottom of said internal layer so that excrement enters said external layer through said elastic tightening hole or said piston valves and remains between said internal layer and said external layer; active carbons are further provided in said plastic bag.

8. The portable multifunctional commode chair, as recited in claim 7, wherein said telescopic stainless steel pipe is further mounted on said foldable chair back; second connecting elements are symmetrically provided on said lower supporting ring and said first connecting elements are provided at a top of said closing covering, wherein said telescopic stainless steel pipe and said first connecting elements at said top of said closing covering are connected with each other and said cushion is connected with said second connecting elements on said lower supporting ring by said fixing pole.

9. The portable multifunctional commode chair, as recited in claim 2, wherein said telescopic stainless steel pipe is further mounted on said foldable chair back; second connecting elements are symmetrically provided on said lower supporting ring and said first connecting elements are provided at a top of said closing covering, wherein said telescopic stainless steel pipe and said first connecting elements at said top of said closing covering are connected with each other and said cushion is connected with said second connecting elements on said lower supporting ring by said fixing pole.

10. The portable multifunctional commode chair, as recited in claim 1, wherein each of said telescopic chair legs comprises a foldable leg and a telescopic leg, wherein an upper end of said foldable leg and a bottom surface of said cushion are hinged with each other; a second hinging board is provided to allow said upper end of said foldable leg to be hinged with said bottom surface of said cushion; a lower end of said foldable leg is inserted in said telescopic leg, wherein said foldable leg comprises an elastic sticking column and said telescopic leg has a row of positioning holes; said foldable leg is connected to said positioning holes of said telescopic leg by sticking said elastic sticking column therein; said foldable leg is able to be folded with said cushion.

11. The portable multifunctional commode chair, as recited in claim 1, wherein said plastic bag comprises a two-layer plastic bag having an internal layer and an external layer and a space is provided between said internal layer and said external layer, wherein an elastic tightening hole is provided at a top of said internal layer and piston valves are provided at a bottom of said internal layer so that excrement enters said external layer through said elastic tightening hole or said piston valves and remains between said internal layer and said external layer; active carbons are further provided in said plastic bag.

12. The portable multifunctional commode chair, as recited in claim 11, wherein said telescopic stainless steel pipe is further mounted on said foldable chair back; second connecting elements are symmetrically provided on said lower supporting ring and said first connecting elements are provided at a top of said closing covering, wherein said telescopic stainless steel pipe and said first connecting elements at said top of said closing covering are connected with each other and said cushion is connected with said second connecting elements on said lower supporting ring by said fixing pole.

13. The portable multifunctional commode chair, as recited in claim 1, wherein said telescopic stainless steel pipe is further mounted on said foldable chair back; second connecting elements are symmetrically provided on said lower supporting ring and said first connecting elements are provided at a top of said closing covering, wherein said telescopic stainless steel pipe and said first connecting elements at said top of said closing covering are connected with each other and said cushion is connected with said second connecting elements on said lower supporting ring by said fixing pole.

14. The portable multifunctional commode chair, as recited in claim 1, wherein a pair of foldable armrests are further connected to said foldable chair back; a back end of each said foldable armrest is hinged on said foldable chair back; a third hinging board is provided to allow said back end of each said foldable armrest to be hinged on said foldable chair back; a front end of each said foldable armrest and each of a pair of upright column are hinged with each other; hinging boards of armrests are provided to allow said front end of each said foldable armrest to be hinged with said upright column; two sockets are provided at two sides of said chair and a lower end of each said upright column is inserted in each said socket; each said upright column is able to be folded with said cushion.

15. The portable multifunctional commode chair, as recited in claim 1, wherein said closing covering further comprises a built-up upright pole frame comprising an upright pole, said upper supporting ring and said lower supporting ring, wherein said upright pole has an upper end and a lower end respectively connected to said upper supporting ring and said lower supporting ring; said upright pole is fixed with said cushion of said chair through said fixing pole; said opaque textile or said plastic cloth is surrounded between said upper supporting ring and said lower supporting ring; said door for opening and closing is provided on said opaque cloth or said plastic cloth.

16. The portable multifunctional commode chair, as recited in claim 15, wherein a zipper or a nylon hasp is provided to connect said door provided on said opaque textile or said plastic cloth to said opaque textile.

17. The portable multifunctional commode chair, as recited in claim 1, wherein a zipper or a nylon hasp is provided to connect said door provided on said opaque textile or said plastic cloth to said opaque textile.

18. The portable multifunctional commode chair, as recited in claim 1, wherein a second convex portion is provided at a top of said lid and a second concave portion of a chair back pole of said foldable chair back and said lid are connected with each other by sticking said convex portion in said concave portion thereof.

19. The portable multifunctional commode chair, as recited in claim 1, wherein said movable clamping ring and said lid are made of plastic or a mixture of plastic and nano silver, or coated with chelating ionic silver.

20. The portable multifunctional commode chair, as recited in claim 1, wherein said cone-shaped head provided at a front end of said annual plug is made of plastic or a mixture of plastic and nano silver, or coated with chelating ionic silver; said anal plug is made of potato starches.

\* \* \* \* \*